June 22, 1965     J. H. SWINNY     3,190,386
MOTORIZED STEERABLE NESTABLE SERVICE CART
Filed April 25, 1963     3 Sheets-Sheet 1

INVENTOR
James H. Swinny

BY *Tustan Miller*
ATTORNEY

June 22, 1965  J. H. SWINNY  3,190,386
MOTORIZED STEERABLE NESTABLE SERVICE CART
Filed April 25, 1963  3 Sheets-Sheet 2

INVENTOR
James H. Swinny

BY Justave Miller
ATTORNEY

June 22, 1965 J. H. SWINNY 3,190,386
MOTORIZED STEERABLE NESTABLE SERVICE CART
Filed April 25, 1963 3 Sheets-Sheet 3
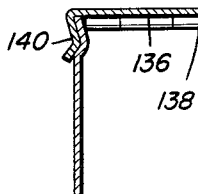
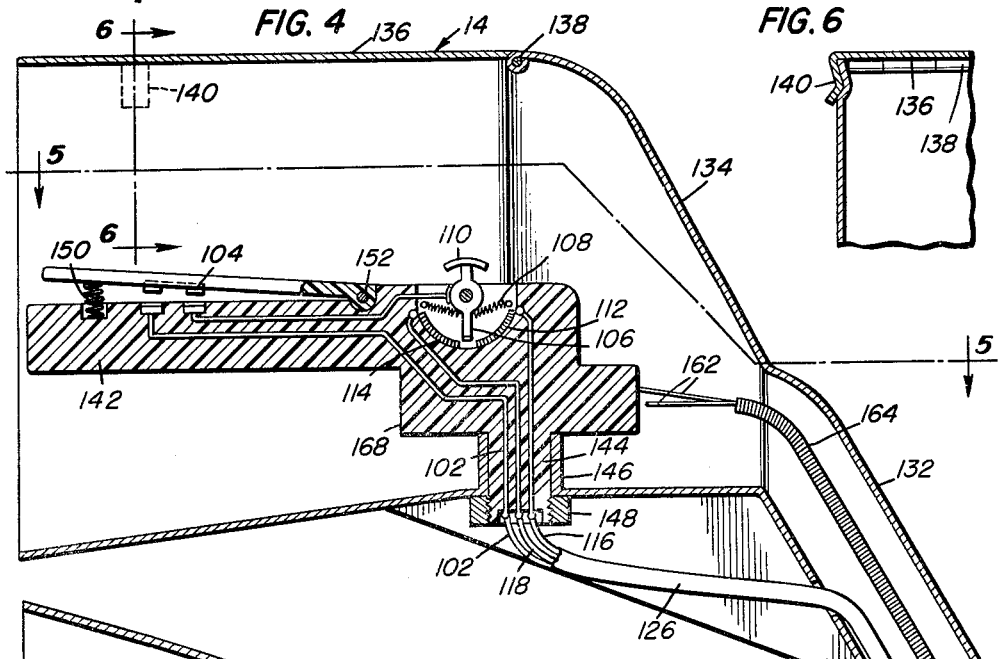
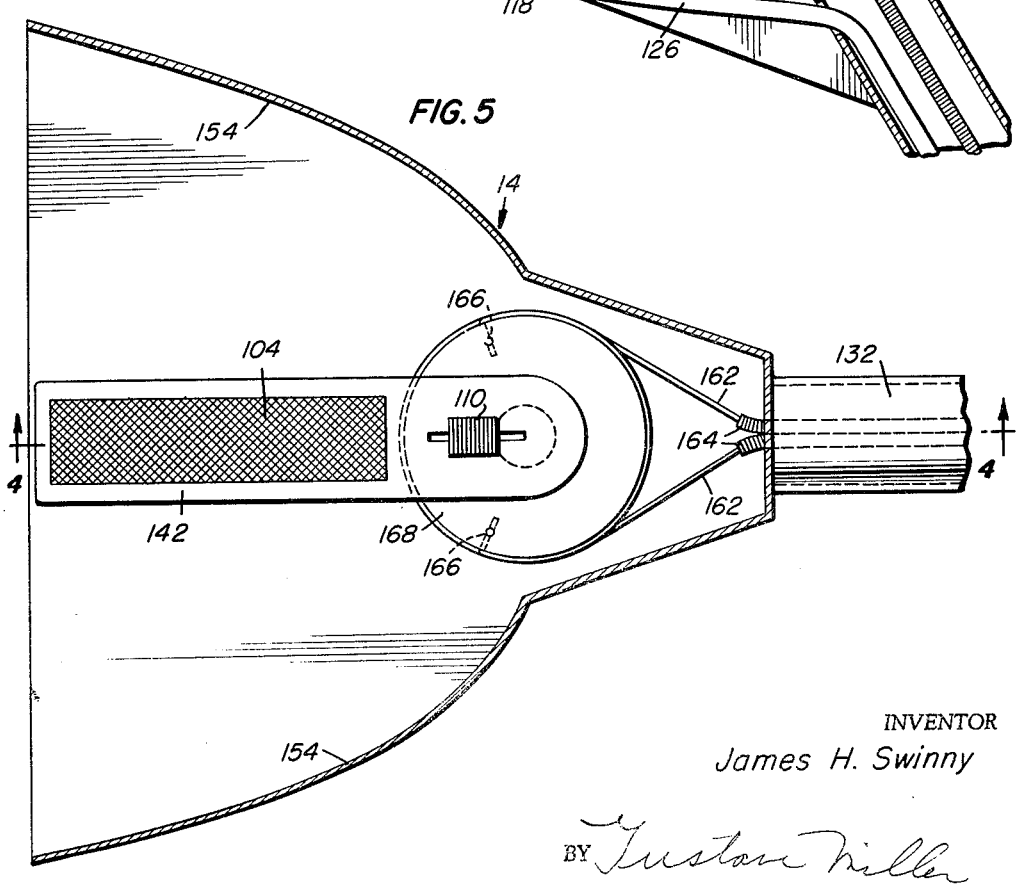
INVENTOR
James H. Swinny
ATTORNEY

United States Patent Office 3,190,386
Patented June 22, 1965

3,190,386
MOTORIZED STEERABLE NESTABLE
SERVICE CART
James H. Swinny, 212 Linton Ave., Natchez, Miss.
Filed Apr. 25, 1963, Ser. No. 275,572
14 Claims. (Cl. 180—19)

This invention relates to a dirigible, nestable service cart, and has for an object to provide an improved service cart, such as a grocery cart or the like, which, although motorized, can still be nested so that several of the nestable motorized carts of this invention can occupy considerably less space when nested together than they otherwise would when not in nested position.

Although nestable service carts, particularly grocery carts, are well known, and motorized dirigible service carts such as used by ice cream vendors, golf players and others are likewise well known, there has not been any prior practical disclosure of a nestable service cart that is motorized or electrically powered.

Still a further object of this invention is to provide an electrically powered nestable service cart having a manually controllable steering means and combined electric power control means which will automatically cut off electric power whenever the hand is removed from the steering means.

Still a further object of this invention is to provide a nestable electrically powered grocery cart having a combination steering tiller and power switch biased to the "off" position so as to automatically stop any movement of the grocery cart whenever the hand is removed from the tiller.

Still a further object of this invention is to provide a dirigible means for an electrically powered nestable grocery cart having a steering tiller which, when moved or pivoted within a limited amount, will rotate a steerable traction wheel to a greater degree, thus providing an extremely short turning radius of the grocery cart, and to further provide a device wherein a limited pivotal movement of the tiller can turn the steering traction wheel means up to a limit of approximately 110° either side of the forward direction, thus making it possible to turn the cart within its own length.

Still a further object of this invention is to provide a steerable motorized wheel assembly for a grocery cart or other service cart, which still makes it possible to nest the service or grocery cart to a substantial amount, and which is provided with a "dead man" control so that the power will automatically turn off and stop the movement of the grocery cart whenever the operator's hand is removed from the tiller.

Still a further object of this invention is to locate a combination tiller and power control on a dirigible nestable grocery cart that is accessible only to an operator walking behind the cart, and is inaccessible to a child being carried in a conventional seat in the cart.

With the above and related objects in view, this invention consists in the details of construction and combination of parts, as will be more fully understood from the following description, when read in conjunction with the accompanying drawings, in which:

FIG. 4 is a sectional view through the manual controls, on line 4—4 of FIG. 1 and of FIG. 5.

FIG. 5 is a sectional view on line 5—5 of FIG. 4.

FIG. 6 is a detail fragmentary view on line 6—6 of FIG. 4.

Figure 1:
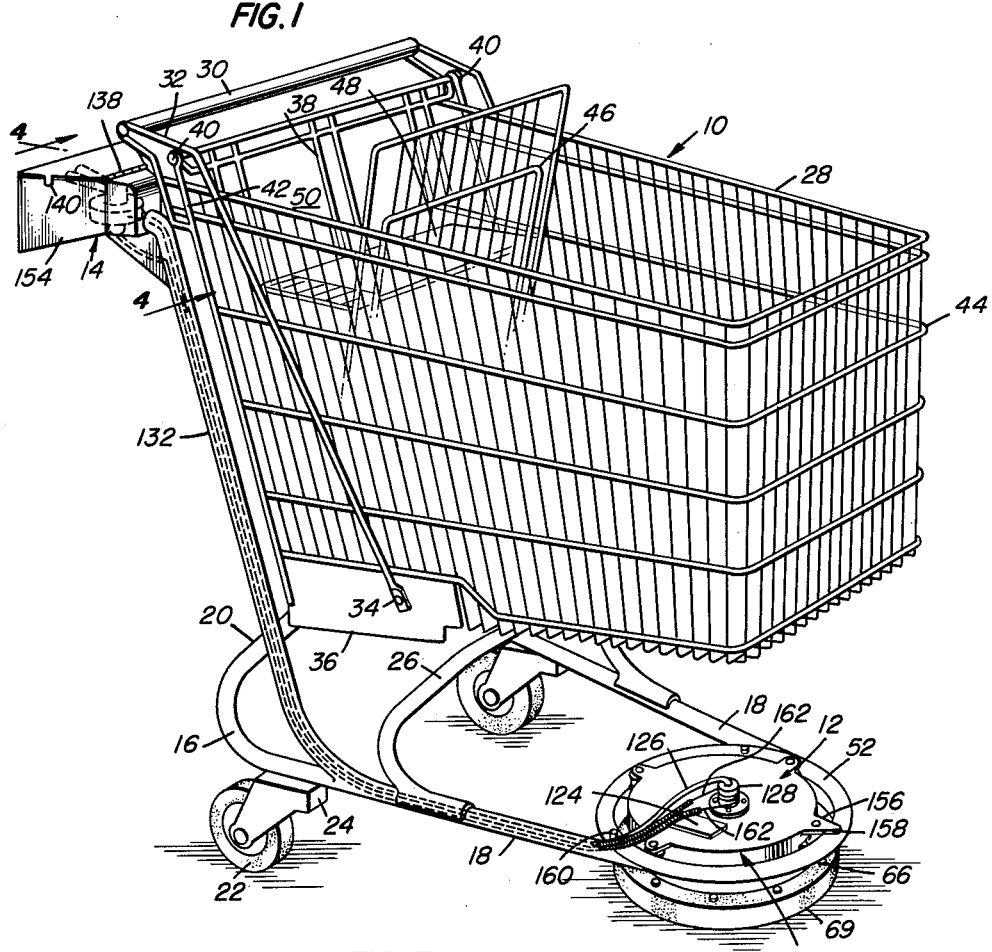
FIG. 1 is a perspective view of a conventional service cart, such as a grocery shopping cart, in which this invention has been installed.

There is shown at 10 a conventional service or grocery shopping cart, to which this invention, including the motorized wheel assembly unit 12 and manual controls 14, have been added. The conventional service or grocery shopping cart 10 to which this invention has been added, includes an undercarriage or base frame 16, which may be of hollow tubing having a pair of forwardly inwardly converging arms 18 and a connecting rear tube 20, a pair of rear wheels 22 being journaled in a pair of rear brackets 24 rigidly secured to the rear ends of the base tubes 18. An intermediate cross bar 26 may also be secured on the converging tubes 18, the rear tube 20 and the cross tubes 26 assisting in supporting the conventional service or grocery basket 28 in a conventional and customary manner.

The basket 28 has a conventional transverse handle 30 consisting of a bar extending transversely thereacross and secured on appropriate rods 32 extending from the basket 28, the lower ends of the rods 32 being secured by a pin 34 to a side plate 36 of the basket 28. In one form of conventional basket, a back wall 38 may be pivotally secured at 40 to an arm 42 of the rod 32, so that when the forward end 44 of one basket abuts against the back wall 38 of the basket of another similar cart, the back wall 38 may be pivoted from an upright depending position as illustrated, to a forwardly extending position approaching the horizontal, as one basket nests into the other basket. As illustrated here, a child's seat of conventional construction, including a back rest 46, a buttocks support 48 and leg openings 50, is included in the back wall 38 for operation in a conventional manner.

The construction thus far described refers to one conventional type of service cart or grocery cart, but it will be obvious that any other conventional service cart or grocery cart having similar characteristics such as the forwardly converging undercarriage base and properly slanted frame bars 18 spaced below the forwardly converging conventional basket 28 with the pivoted back wall 38 so that the baskets may nest one into another, may be substituted for the particular conventional details already described.

Normally, the forwardly converging undercarriage bars 18 are joined at their front ends in a conventional manner and provided with forward caster wheels. In this invention, the conventional forward wheels and connection between the forward end of the undercarriage base bars 18 are omitted, and instead, a tubular ring is secured to and merged with the forward ends of the tubular bars 18, and provides a supporting ring track 52 cooperating with the vertically extending spool-shaped bearings 54 of a housing 56 forming part of the motorized wheel assembly unit 12. The spool bearings 54 are journaled on vertical bearing rods 58 extending between horizontally extending ears 60 extending from the housing 56. While a minimum of three spool bearings 54 may be provided, four such bearings 54 are here illustrated as providing somewhat better stability and support.

The housing 56 includes a circular side wall 62 depending from a transverse top wall 64 and having secured thereto, by bolts and nuts 66, a bottom floor 68. Also secured by the same bolts and nuts is a depending, somewhat flexible rubber skirt 69 of sufficient rigidity to prevent small articles from readily entering under the motorized wheel assembly 12 and interfering with its operation. The bottom floor 68 is provided with a slotted rectangular opening 70 through which extends a pair of spaced apart traction wheels 72 journaled on an axle 74 in bearings 76 secured by studs 78 to the housing floor 68.

The axle 74 is journaled in its bearings 76, but has the wheels 72 fixed to each other with a large sprocket gear 80 therebetween over which extends a sprocket chain 82 which, in turn, then extends over a small sprocket gear 84 on a power transmitting shaft 86 journaled in bearings 88 on the housing floor 68 and having a gear 90 in mesh with a worm 92 powered by a reversible electric motor 94 supported on the floor 68 to one side of the slotted opening 70. Supported on the opposite side of the slotted opening 70 is a conventional high power electric battery 96.

A common ground conduit 98 connects one side of the battery 96 to a middle connection 100 of the reversible motor 94, and the other side of the battery is connected by a conduit or circuit line 102 which connects through an automatic interruptor switch 104 to a rheostat switch arm 106, spring biased at 108 to the "off" position as shown. This rheostat switch arm 106 is provided with a thumb control 110 for movement over either of the two separate rheostat resistances 112 or 114 through the conduit or circuit lines 116 and 118, back to the motor at 120 and 122, one of the rheostat resistances 112 connecting the motor 94 through the circuit line 116 for operation in one direction, while the other one 114 connects the motor 94 through circuit line 118 for operation in the opposite direction.

An access plate 124 is provided in the top wall 64 over the battery 96 both for servicing the battery 96 as when adding battery fluid, as well as for providing access to the battery poles for a recharging conduit (not shown) which may be readily attached thereto whenever needed in a conventional manner for recharging the battery 96.

The three circuit lines 102, 116 and 118 are gathered into a flexible cable 126 extending upwardly through a hollow shaft 128 rigidly secured at 130 centrally of the housing top wall 64. The cable 126 extends through an appropriate opening into one of the forwardly extending tubes 18 and then extends through a merging tube 132 along one side of the basket 28. On the upper end of the hollow tube 132 there is supported a manual control guard 134 for the manual control 14 therewithin, the top wall 136 of the guard 134 being hinged at 138 and provided with snap ears 140 for holding the top wall 136 in closed position when desired.

Figure 7:
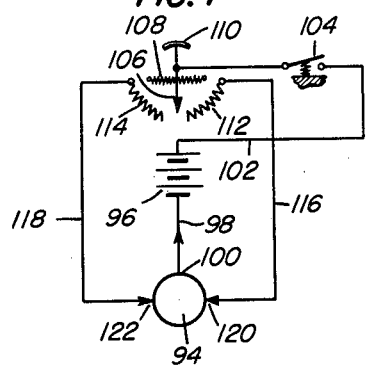
FIG. 7 is a diagrammatic view of the control circuit.
Figure 2:
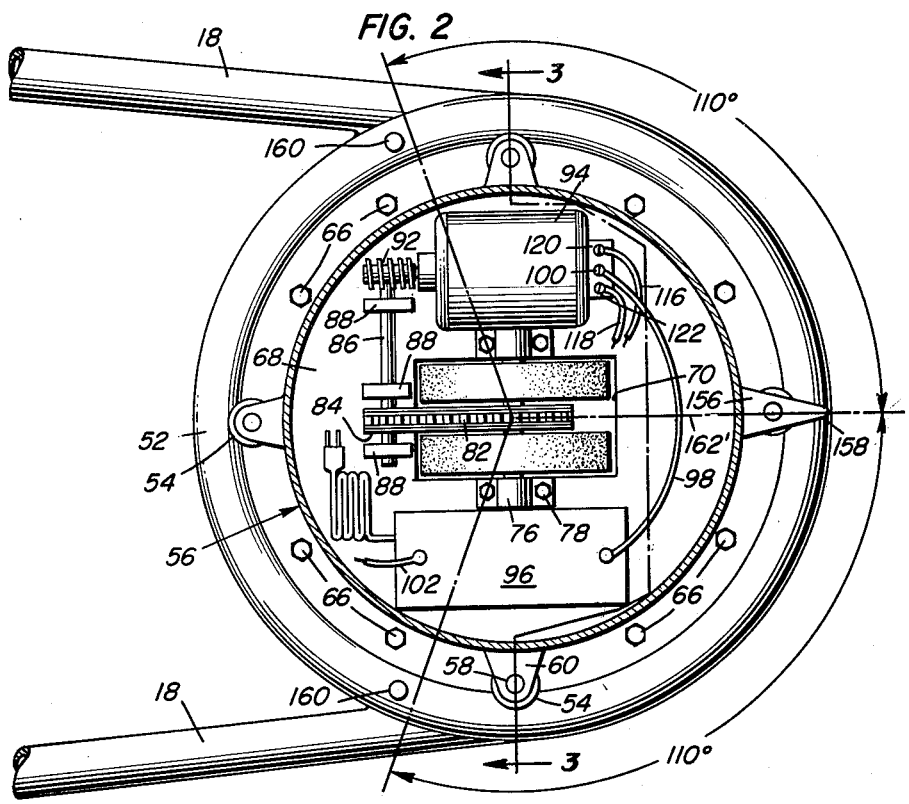
FIG. 2 is a top plan view of the details of the motorized wheel assembly unit, the top wall being omitted, on line 2—2 of FIG. 3.
Figure 3:
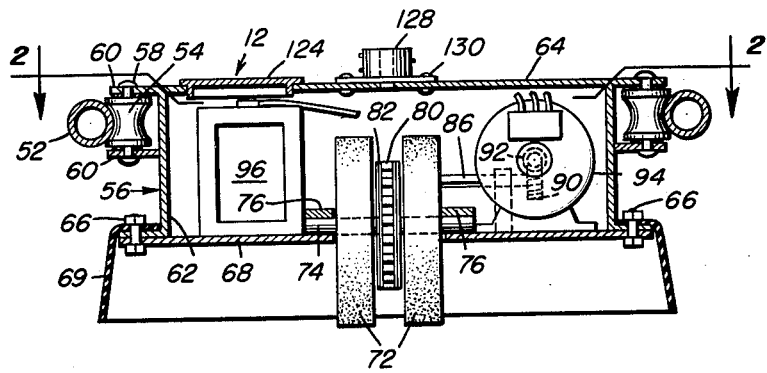
FIG. 3 is a sectional view of the motorized wheel assembly unit on line 3—3 of FIG. 2.

A steering tiller 142 of suitable rigid insulating material is pivotally journaled at 144 in a hollow boss 146 extending upwardly from the bottom wall of the manual control guard 134, and held therethrough by a nut 148. The space between the side walls 154 of guard 134 limits the pivotal movement of the tiller 142, for the hand holding the tiller 142 would abut the side walls if turned too far. Located on the tiller 142 is the circuit interruptor switch 104 normally biased to "off" position by the spring 150 and adapted to be held in circuit completing position when gripped by the fingers and palm of a human hand, this switch 104 being pivoted at 152. Mounted within the same tiller 142, slightly forwardly of the pivot 152, is the thumb-receiving rheostat 110, with the rheostat elements 112 and 114 and the "off" biasing springs 108 secured therein, the circuits 102, 116 and 118 extending through the tiller to the cable 126, as illustrated in FIG. 4 and FIG. 7.

As will be apparent, manipulating the rheostat thumb switch 110 by means of the thumb, to complete the circuit to the rheostat portion 112, will complete the circuit to the forward side of the motor 94, while operating the thumb switch 110 in the opposite direction will connect the motor for operation in the reverse direction. Releasing the thumb switch 110 will, under action of the bias springs 108, return the thumb switch 110 to an "off" position between the two rheostat resistances 112 and 114. Similarly, release of pressure on the switch 104 will interrupt the circuit to the motor. Due to the worm and gear connection at 90 and 92 between the motor 94 and the traction wheels 72, it is obvious that interrupting the circuit to the motor will immediately stop rotation of the traction wheels 72, and thus stop movement of the cart, thus providing a "dead man" switch and a double safety feature in that the cart will not possibly be powered unless the operator pays full attention thereto and both squeezes the switch 104 and manipulates rheostat switch 110.

It will be obvious that instead of a pair of traction wheels 72, a single traction wheel could be provided with a similar power train between the motor 94 and the single traction wheel, and it is also obvious that suitable rubber tires may be provided on the traction wheels so as to give them positive, non-slip traction on whatever floor surface the cart is traveling over.

Due to the fact that the motorized wheel assembly 12 supports the undercarriage of the grocery or service cart 10 by means of the spool bearings 54 rotating about the tubular ring track 52 secured to the converging tubular arms 18, the cart 10 is not only motorized and nestable, due to the comparatively small diameter of the track ring 52 as compared to the overall length of the cart 10, but is also dirigible. The rotation of the motorized wheel assembly unit 12 is limited by providing one normally forwardly extending upper spool ear 156 with a forwardly extending finger 158 extending over the track ring 52, and arranged to abut either stop boss 160, suitably secured on ring 52 at positions at 110° on each side of a radius 162' extending forwardly in a plane parallel to the plane of the traction wheels 72.

In order to controllably steer the motorized wheel assembly unit 12 within the limits of the stop portions 160 on the ring 52, a pair of flexible cables 162 are wrapped around the small hollow shaft 128 and secured thereto in any suitable manner. Each cable 162 extends through its own flexible housing 164 which, together with the flexible electric cable 126, is threaded through the hollow tube 132 with the ends extending partly around and anchored at 166 to a round base 168 of tiller 142, concentric with the journal 144 extending through the hollow boss 146. It will be noted that the diameter of the round base 168 of tiller 142 is substantially greater than the diameter of the small hollow shaft 128. As a result, the angularity of the pivotal movement of the tiller 142 is multiplied a sufficient amount so that wheel assembly unit 12 will rotate several times as many degrees as the degrees of pivotal movement of tiller 142. Thus, the ratio of the diameter of the hollow shaft 128 to the diameter of the round base 168 of the tiller 142 permits the motorized wheel assembly unit 12 to be rotated 110° to either side of the forward position before the hand holding the tiller 142 could reach or touch the inside walls 154 of the guard 134 for the manual controls.

In operation, while the handle 30 may be held in the left hand in the conventional manner, it will not be necessary to either push or steer the cart 10 by the handle 30, but instead, the steering and the power will be manipulated through the controls 14 located within the guard 134. Assuming the battery is properly charged, the operator will merely take hold of the tiller 142 in the right hand and close his palm thereover, placing his thumb on the rheostat control switch 110, pushing it in one direction or the other according to whether he wishes the cart to go forwardly or backwardly. Pivoting the tiller 142 to one side or the other will, through the flexible steering cables 162, rotate the motorized wheel assembly unit 12 about the axial center of the hollow shaft 128 on the tubular ring track 52 to steer the basket in the desired direction. The steering extends to 110° in either direction from straight ahead, thus making it possible to rotate the cart within its own length, if desired.

The battery 96 will preferably be of sufficient power to provide for a minimum of one day's maximum use, and preferably, for several days of average use, so that the service cart can be used continuously throughout the day. Then, during inactive periods such as when either the store is closed, or when a certain number of the carts are not actively needed, the inspection or access plate 124 is opened, permitting conventional connection of the charging cables to the poles of the battery 96 in the conventional manner at a suitably provided charging station.

During the day, the baskets then may be nested within limits provided by the outside diameter of the tubular ring track 52, for one basket 28 may be noted in another basket by merely pushing the cart 10 forwardly in the usual conventional manner, until the ring track 52 of one cart abuts the ring track 52 of the cart into which it is nested, and then a third cart may be nested in the second cart in a similar manner. Obviously, such carts will not nest in the same amount of space as carts not having the motorized wheel assembly unit control of this invention, but they will still nest sufficiently to save a substantial amount of space, and thus permit a sufficient number of motorized dirigible nestable service or grocery carts of this invention to be nested together and be available for use without too much lost storage space.

The gear ratio will preferably be such that the maximum speed would be that of a slow walk at approximately three miles an hour, while the speed may be controllably less by manipulating the thumb-controlled rheostat switch 110. Should the operator forget to pay attention to the controls, and either fail to keep the thumb holding the switch 110 at the selected position, or fail to hold the interruptor switch 104 depressed to complete the circuit, the circuit will be interrupted and, due to the worm and gear connection at 90 and 92 from the motor 94 to the traction wheels 72, the cart 10 will necessarily immediately stop its movement, thus eliminating danger of a runaway cart, or of a cart being in motion with no one intentionally controlling it.

While this invention has been described as being an electrically powered motorized cart, it will be understood that electrical power is the preferred form when the cart is intended for use indoors, particularly as a grocery service cart, but it will be understood also that other types of motors may be used when the environment of the location where the cart is to be used is such as to admit the use of other types of power, particularly if outdoor use alone is contemplated. In such a case, of course, the control rheostat would be replaced by a throttle appropriate to the particular type of power unit.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A motorized, dirigible, nestable service cart comprising a frame, a rear handle secured thereto, an open top container mounted on said frame, said container including side walls and a back wall hinged at the upper portions thereof on said frame for movement between the normal upwardly extending position and a forwardly extending position, said frame including a base portion extending forwardly of its rear portion and spaced below said open top container mounted thereon, wheel assembly means depending from and supporting the rear base portion of said frame, said base portion of said frame including a pair of forwardly and inwardly converging side portions, means connecting said side portions together at their front ends, a dirigible, motorized wheel assembly, means mounting said wheel assembly on the forward portion of said base portion, and power and steering control means extending from said powered wheel assembly along a side of said frame up to and adjacent said rear handle and terminating in manually operable control means therefor.

2. The cart of claim 1, said cart being a grocery cart, a child-carrying seat mounted on said back wall, and guard means about said manually operable control means preventing access thereto by an occupant of said seat.

3. The cart of claim 1, said manually operable control means including a tiller, means connecting said tiller to said wheel assembly to permit said tiller to steer said wheel assembly, said wheel assembly including a source of electricity, traction wheel means journaled therein, a reversible electric motor operatively connected thereto, and electric cable means extending from said motor to a rheostat and switch means biased to circuit interrupting position mounted on said tiller.

4. The cart of claim 1, said connecting means including a tubular ring track, said wheel assembly mounting means comprising bearing means rotatably mounting said wheel assembly on said tubular ring track, said wheel assembly including a vertically extending small diameter shaft secured axially of said rotatably mounted wheel assembly, a pair of flexible cables secured at one of their ends to and wrapped about said small shaft, said manually operable means including a large diameter shaft, a steering tiller secured thereto, the other ends of said flexible cables being wrapped about and secured to said large diameter shaft, whereby pivotal motion of said tiller rotates said wheel assembly and magnifies the rotation of said wheel assembly over the rotation of said large diameter shaft.

5. The cart of claim 4, said wheel assembly including a source of electricity, traction wheel means journaled therein, a reversible electric motor operatively connected thereto, and electric cable means extending from said motor through said small diameter hollow shaft to a rheostat and switch means biased to circuit interrupting position mounted on said tiller.

6. A nestable dirigible motorized service cart comprising a service cart having an undercarriage and a basket supported thereby in spaced relation thereabove, said basket having a forwardly pivotal rear wall and said undercarriage being rearwardly open, said basket and said undercarriage both converging forwardly, wheel means supporting the rear portion of said undercarriage, and dirigible motorized wheel assembly means supporting the forward portion of said undercarriage.

7. The cart of claim 6, said motorized wheel assembly means including means pivotally securing said motorizing wheel assembly means to said undercarriage, pivot control and motor control connecting means extending from said motorized wheel assembly means to a manual control means mounted on the upper rear portion of said basket.

8. The cart of claim 7, said manual control means including a pivotal steering tiller including a large diameter pivotally mounted shaft secured thereto, a small diameter shaft secured centrally of said motorized wheel assembly means, and said connecting means including flexible cable means wrapped around both said large and small diameter shafts, whereby pivotal movement of said tiller pivots said motorized wheel assembly means in proportion to said shaft diameters.

9. The cart of claim 8, a cooperating means on said wheel assembly means and said undercarriage limiting the pivotal movement of said motorized wheel assembly means.

10. The cart of claim 9, and protecting skirt means depending circumferentially from said motorized wheel assembly means.

11. The cart of claim 8, said manual control means also including motor control means mounted in said steering tiller, and means normally biasing said motor control means to "off" position.

12. The cart of claim 11, said small diameter shaft being axially hollow, said motor control means extending through said hollow small diameter shaft.

13. The cart of claim 11, said motorized wheel assembly means including a reversible electric motor and a source of electricity, said manual motor control means in said tiller comprising a rheostat switch and an interruptor switch both normally biased to "off" position.

14. The cart of claim 13, said cart being a grocery cart, a child-carrying seat mounted on said back wall, and guard means about said manually operable control means preventing access thereto by an occupant of said seat.

References Cited by the Examiner
UNITED STATES PATENTS

| | | |
|---|---|---|
| 1,171,992 | 2/16 | Walser. |
| 2,663,376 | 12/53 | Curley _____ 180—19 |
| 2,674,328 | 4/54 | Searls _____ 180—19 |
| 2,772,113 | 11/56 | Berard. |
| 2,958,537 | 11/60 | Young _____ 280—33.99 |
| 2,978,053 | 4/61 | Schmidt _____ 180—65 X |
| 3,044,801 | 7/62 | Vicany _____ 280—33.99 X |

References Cited by the Applicant
UNITED STATES PATENTS

| | | |
|---|---|---|
| 2,530,941 | 11/50 | Devirian. |
| 2,706,008 | 4/55 | Voigt. |
| 2,710,069 | 6/55 | Johnson. |
| 2,856,194 | 10/58 | Dumsha. |
| 2,890,059 | 6/59 | Brooks et al. |
| 2,924,287 | 2/60 | Bramley. |
| 2,998,978 | 9/61 | Sides. |
| 3,023,018 | 2/62 | Welter. |
| 3,061,031 | 10/62 | Packard. |

A. HARRY LEVY, *Primary Examiner.*